INVENTORS:
KURT SCHULLER
HANS JOACHIM SCHWERDHÖFER

*Squire & Olcott*

Attys.

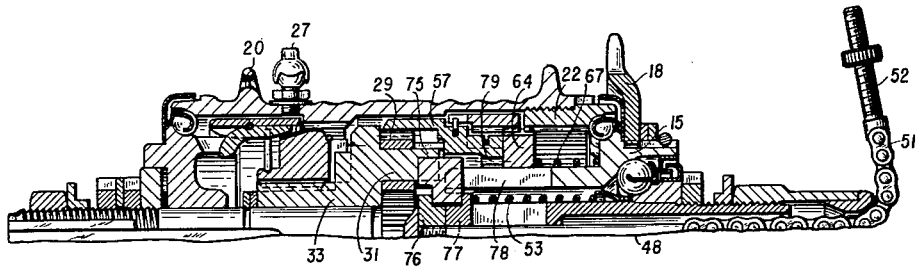
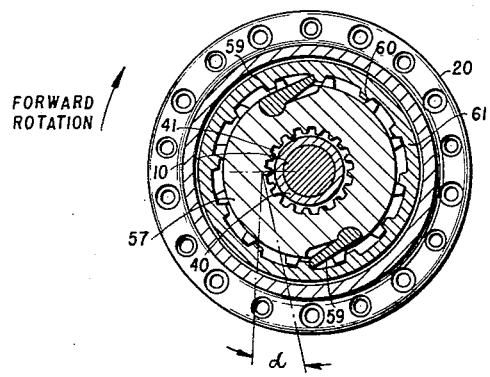
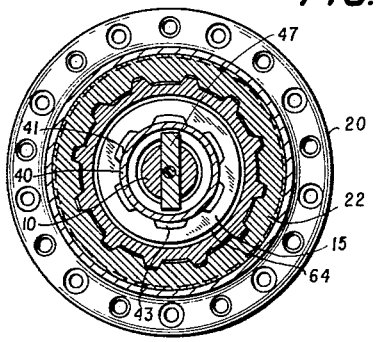

United States Patent Office 3,122,226
Patented Feb. 25, 1964

3,122,226
THREE-SPEED WHEEL HUB WITH SPLINED RATCHET CONTROL SLEEVE
Kurt Schuller and Hans Joachim Schwerdhöfer, both of Schweinfurt (Main), Germany, assignors to Fichtel & Sachs A.G., Schweinfurt (Main), Germany, a corporation of Germany
Filed Nov. 2, 1961, Ser. No. 149,584
Claims priority, application Germany Nov. 4, 1960
5 Claims. (Cl. 192—6)

The present invention relates to multi-speed wheel hubs, including coaster brake mechanism and more particularly to improved coupling means in the form of a splined ratchet control sleeve used for engaging and disengaging the driving pawl mechanism which is operative both in high speed and in normal speed but which must be rendered inoperative during operation in low speed.

Briefly, the invention comprises an axially displaceable splined sleeve member which slides in complementary recesses so that it is continuously connected to rotate as a unit with the hub barrel of the coaster brake. The splined sleeve member is engageable with and disengageable from a drive ring member having internal ratchet teeth. The ratchet teeth of the drive ring member are engaged at all times by pawls carried by the ring gear member of the planetary gearing. During high speed and normal speed operation, the teeth of the splined coupling sleeve member remain in engagement with the ratchet teeth of the drive ring member. For low speed operation, the splined ratchet control coupling sleeve member is axially withdrawn from engagement with the drive ring member.

The ratchet teeth of the drive ring member are so spaced that a suitable angle of rotational play is provided between the spline teeth of the ratchet control sleeve and the ratchet teeth of the drive ring member which are engaged by the splined teeth. This angle of play is required to prevent locking of the brake when the bicycle is pushed backward after braking.

The splined sleeve of the present invention transmits torque with the accompanying forces uniformly distributed among a plurality of teeth so that maximum stress magnitudes are reduced. Additionally, wear is retarded by this feature. Preferably, the spline teeth are of involute or cycloidal configuration and the complementary grooves in the sleeve fixed to the hub barrel are correspondingly shaped.

The invention will be better understood from the following specification, reference being had to the accompanying drawing forming a part hereof.

Referring to the drawing:

FIGURE 4 illustrates a modified form of construction wherein a coupling sleeve used in FIGS. 1, 2 and 3 is replaced by an axially displaceable drive member.

FIGURE 5 is a transverse sectional view taken along the line V—V of FIG. 1.

FIGURE 6 is a transverse sectional view taken along the line VI—VI of FIG. 1.

Figure 1:
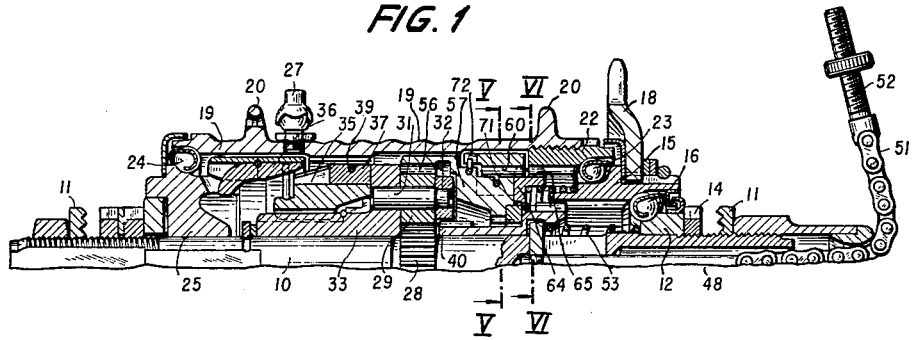
FIGURE 1 is a view in axial section of a three-speed coaster brake embodying the invention, the lower half being omitted for simplicity of illustration, the parts being positioned for high speed operation.

A fixed axle 10 is adapted to be secured to the frame of a bicycle (not shown) by serrated nuts 11. An inner ball bearing race member 12 is secured on the axle 10 by a lock nut 14. A drive member 15 is freely revoluble on bearing balls 16 carried by the inner race member 12. A sprocket 18 is fast on the drive member 15. The sprocket 18 is driven by the usual bicycle chain (not shown).

The hub barrel 19 is provided with flanges 20 which receive the inner ends of the spokes (not shown) of the bicycle wheel. At its right hand end, the barrel 19 is threadedly fixed to a cylindrical sleeve 22. The sleeve 22 is freely revolubly supported on the drive member 15 by bearing balls 23. At its left hand end, the barrel 19 is freely revolubly supported by bearing balls 24 on a fixed brake member 25. The barrel 19 is provided with an oil cup 27 for the injection of lubricant into the coaster brake mechanism.

Figure 2:
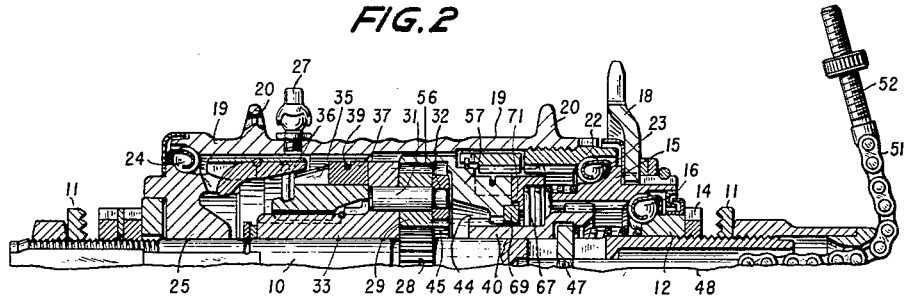
FIGURE 2 is similar to FIG. 1 showing the parts positioned for normal speed operation.
Figure 3:
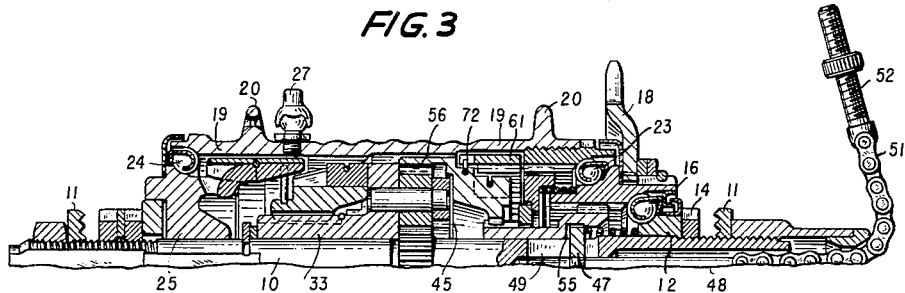
FIGURE 3 is similar to FIG. 1 showing the parts positioned for low speed operation.

A sun gear 28 is provided by teeth integrally formed on the axle 10. The sun gear 28 is in continuous meshing engagement with a series of planet gears 29. Each planet gear 29 is individually freely revolubly mounted on a pin 31. An internally toothed connecting ring member 32 is fixed to the free ends of all of the pins 31 and holds all of the planet gears 29 against axial displacement toward the right. All of the pins 31 are fixedly mounted on a planet carrier 33. The planet carrier 33 is freely revoluble on the axle 10. An axially displaceable brake cone member 35 is threadedly engaged on the left hand portion of the planet carrier 33. Upon reverse rotation of the planet carrier 33, the brake cone 35 moves leftwardly and expands a brake ring 36 which is held against rotation by the fixed brake member 25. Upon forward rotation, the brake cone 35 moves to the limit of its travel toward the right as shown in FIGS. 1, 2 and 3. A pawl carrier ring 37 is supported by the brake cone member 35 and rotates in the forward direction along with the planet carrier 33 after the brake cone member 35 has reached the limit of its travel toward the right. The pawls of the pawl carrier ring 37 may then engage ratchet teeth 39 formed on the internal surface of the hub barrel 19 for driving the hub forward during low speed operation. Upon backward rotation of the planet carrier 33, the brake 35, 36 is actuated by leftward displacement of the brake cone member 35.

An axially displaceable gear shifting coupling sleeve 40 is freely revolubly mounted on the axle 10. At its right hand end, the gear shifting coupling sleeve 40 is provided with external teeth 41 which continuously engage complementary internal spline teeth 43 formed on the drive member 15. At its left hand end, the gear shifting coupling sleeve 40 is provided with external teeth 44. In FIG. 1, the teeth 44 are shown in engagement with internal teeth 45 formed in the ring member 32 to drive the planet carrier 33.

An axially displaceable block 47 is threadedly secured to one end of a control rod 48. The block 47 is freely slidable in a transversely extending longitudinal slot 49 formed in the axle 10. The axial position of control rod 48 is changed by a chain 51 which extends to a threaded rod 52 which is displaced by a conventional control device (not shown). The block 47 is yieldingly urged toward the left by a helical compression spring 53. It may be pulled toward the right against the action of spring 53 by chain 51. The free ends of the block 47 which protrude beyond the edges of the slot 49 are freely slidably received in an annular groove 55 formed on the internal surface of the gear shifting coupling sleeve 40. The axial position of the gear shifting coupling sleeve 40 is thus controlled by the block 47, control rod 48 and chain 51.

The planet gears 29 are in continuous meshing engagement with internal teeth 56 formed on a ring gear member 57. The ring gear member 57 is freely revoluble on the axle 10 and is suitably held against axial displacement. The ring gear member 57 carries two diametrically oppositely located spring-pressed pawls 59 (FIG. 5).

The pawls 59 engage appropriately positioned ones of a series of internal ratchet teeth 60 formed on a drive ring member 61. The drive ring member 61 is freely revolubly supported concentrically with the axle 10 and is suitably held against axial movement.

An axially displaceable ratchet control coupling sleeve member 64 is freely revoluble concentrically with the axle 10. The ratchet control coupling member 64 is provided with integrally formed circumferentially spaced external spline teeth 65 which extend leftwardly as illustrated in FIGS. 1 and 2 between axial extensions of the circumferentially spaced internal ratchet 60 of the drive ring member 61. There is an angular amount of circumferential play between the ratchet control coupling member 64 and the drive ring 61 which is indicated in FIG. 5 by the angle α. This amount of play is determined by the circumferential spacing between the spline teeth 65 and the ratchet teeth 60, these spacings being equal on the drive ring 61 and the ratchet control member 64 so that all of the internal ratchet teeth 60 simultaneously engage all of the external spline teeth 65 for uniform distribution of torque transmission stresses among all of the teeth.

The spline teeth 65 of ratchet control member 64 extend toward the right into complementary grooves 66 formed on the internal surface of the sleeve 22 which is fixed to the barrel 19. The spline teeth 65 are axially slidable in the grooves 66 without appreciable circumferential play. The ratchet control coupling member 64 is yieldingly urged leftwardly by a helical compression spring 67 so that the spline teeth 65 are retained axially positioned for engagement with the ratchet teeth 60 during high speed (FIG. 1) and normal speed (FIG. 2) operation. At all times, however, the hub barrel 19 and ratchet control coupling member 64 rotate as a unit with circumferential play amounting to the angle α between the spline teeth 65 and the ratchet teeth 60 whenever these teeth are engageable with each other.

An axially displaceable washer 69 is freely revolubly slidable intermediate the ends of the gear shifting coupling sleeve 40 and is engageable by the right hand ends of the external teeth 41 on sleeve 40 to be forced toward the right. Except in low speed operation (FIG. 3), the washer 69 is located in an annular recess 71 formed partly in the ring gear member 57 and partly in the ratchet control coupling member 64. When the gear shifting coupling sleeve 40 is pulled to its extreme right hand position for low speed operation, as shown in FIG. 3, the end edges of the external teeth 41 thrust the washer 69 toward the right and this movement forces the ratchet control coupling sleeve 64 toward the right against the action of the compression spring 67. The spline teeth 65 are axially withdrawn from their previous position interposed between the ratchet teeth 60 of the drive ring 61 whereby the hub barrel 19 can no longer be driven by the fast moving pawls 59 of the ring gear member 57. Accordingly, the relatively slow moving pawls of the pawl carrier ring 37 overtake and engage the ratchet teeth 39 in hub barrel 19 for low speed drive.

A friction spring 72 couples the ring gear member 57 to the drive ring member 61. When the hub overruns the ring gear member 57 during coasting and prior to braking, the friction spring 72 holds back the drive ring member 61 against rotation with the ratchet control coupling sleeve 64 until the angle of play α has first been taken up.

In coasting, or upon rearward pedaling, the entire planetary gearing 29, 33, 57 remains stationary while the hub barrel sleeve 19, the sleeve 22 and the ratchet control coupling member 64 rotate. The driving ring 61 is prevented from rotating along with the hub barrel 19 by the friction spring 72 until the play or lost motion (angle α) between the two-armed coupling member 64 and the driving ring 61 in the forward direction of rotation has been taken up. If the lost motion angle α is greater than the pitch angle between adjacent ratchet teeth 39 used for low speed drive, then the wheel can be pushed backward after the braking without danger of locking the brake. The low speed ratchet teeth 39 and pawl carrier ring 37 come into engagement, before the lost motion angle α in the rearward direction of rotation has been taken up and releases the brake 35, 36.

On the other hand, if the condition that the lost motion angle α be greater than the pitch angle of the low speed ratchet teeth 39 were not fulfilled, then upon rearward displacement, following braking, a locking of the brake could take place as follows: The brake cone 35 due to the previous braking is in engagement with the brake ring 36. When the wheel is pushed back against the friction thereby produced, the hub barrel 19 and together with the driving ring 61 rotate backwards. If the ratchet teeth 60 of this driving ring come into engagement with the pawls 59 of the ring gear member 57, then upon further turning, the ring gear member 57 will also be turned backward in exactly the same manner as by backward pedaling for braking, and the brake would therefore be reapplied with increased force and locking will occur. On the other hand, if the low speed ratchet teeth 39 first come into engagement with pawl carrier ring 37, as is always the case if the indicated condition is fulfilled, the brake will be disengaged before locking can occur.

The operation of the coaster brake is as follows:

High Speed

As shown in FIG. 1, the coupling sleeve 40 connects the drive member 15 to drive the ring 32 of the planet carrier 33. The planet gears 29 therefore drive the ring gear member 57 at an increased speed with respect to the sprocket wheel 18. The low speed ratchet teeth 39 overrun the pawl carrier ring 37. The pawls 59 of ring gear member 57 engage the ratchet teeth 60 of the drive ring member 61. The drive ring member 61 is in engagement with the splined ratchet control coupling member 64 which, in turn, drives the hub barrel 19 through the sleeve 22.

Normal Speed

The coupling sleeve 40 is displaced to its intermediate position as shown in FIG. 2. The teeth 41 on coupling sleeve 40 now engage complementary internal teeth 56 of ring gear member 57, being disconnected from the planet carrier 33. There is a direct drive without intervening gearing between the sprocket wheel 18 and the hub barrel 19. The operation of the drive ring member 61 and splined ratchet control coupling member 64 remains unchanged and is the same as for FIG. 1. The planet gears 29 idle about the sun gear 28.

Low Speed

The coupling sleeve 40 is moved to its extreme right position as shown in FIG. 3. The drive member 15 remains connected to drive the ring gear member 57. The clutch control coupling member 64, however, is displaced toward the right so that its spline teeth 65 are completely axially withdrawn from the drive ring member 61. Accordingly, the drive ring member 61 is idle and the planet carrier 33 is driven at low speed by the ring gear member 57. The pawls of the pawl carrier ring 37, which rotates forwardly with the planet carrier 33, engage the low speed ratchet teeth 39 and thus drive the hub barrel 19 at low speed.

FIG. 4 shows a modification of the arrangement of FIGS. 1 through 3 in which the coupling sleeve 40 has been replaced by a two-armed drive dog 75. The drive dog 75 is freely revolubly mounted on guide blocks 76, 77 which control the axial position of the drive dog 75. The blocks 76, 77 which protrude beyond the edges of slot 49 may be pulled to the right by control rod 48 against the yielding action of compression spring 53. The drive dog 75 is axially slidable in slots 78 formed in the drive member 15. The drive dog 75 rotates as a unit with the sprocket wheel 18 at all times.

In high speed operation, as shown in FIG. 4, the drive dog 75 engages the free ends of the pins 31 on which the planet gears 29 are mounted. The planet carrier 33 is thus driven by the sprocket wheel 18 as in the case of FIG. 1.

For normal speed operation, the drive dog 75 is shifted to an intermediate position where it engages radially inwardly extending projections 79 formed on ring gear member 57. The ring gear member 57 is thus driven directly without intervening gearing as in FIG. 2.

For low speed drive, the drive dog 75 is displaced to its extreme right position where it moves the splined pawl control coupling member 64 toward the right, thereby withdrawing the spline teeth 65 axially outwardly from between the pawl teeth 60. The drive dog 75 remains in engagement with projections 79 on ring gear member 57 so that low speed operation is obtained as described above.

While we have shown and described what we believe to be the best embodiments of our invention, it will be apparent to those skilled in the art that various changes and modifications may be made therein without departing from the spirit and scope of the invention as defined in the appended claims.

What is claimed is:

1. In a three-speed wheel hub, an axle member 10, an externally toothed sun gear member 28 fixed with respect to said axle member coaxially therewith, a planet carrier 33 freely revoluble coaxially with respect to said axle member, a plurality of planet gears 29 carried by said planet carrier in continuous meshing engagement with said sun gear member, an internally toothed ring gear member 57 surrounding said planet gears in continuous meshing engagement therewith, a hub barrel member 19 freely revolubly surrounding said planet carrier and ring gear member coaxially with said axle member, first pawl carrier means 37 mounted for forward rotation with said planet carrier, a series of internal ratchet teeth 39 formed on said hub barrel member for forward driving engagement by said first pawl carrier means, a sprocket member 18 for driving said coaster brake, an axially displaceable driving member 40 or 75 connected in continuous driving relationship to be driven by said sprocket member, means 47, 48, 49 or 47, 48, 76, 77 for displacing said driving member for selective driving engagement either with said planet carrier or said ring gear member for high speed and normal speed operation, respectively, second pawl carrier means 59 carried by said ring gear member, a drive ring member 61 freely revoluble concentrically with said axle member, said drive ring member having internal ratchet teeth 60 formed thereon for forward driving engagement by said second pawl carrier means, and an axially displaceable splined coupling sleeve member 64 connected in continuous driving relationship with respect to said hub barrel member, said ratchet teeth of said drive ring member being selectively engageable and disengageable by the splines of said splined coupling sleeve member by axial displacement thereof, said driving member being displaceable to cause axial displacement of said splined coupling sleeve member to disengage the splines thereof from said ratchet teeth of said drive ring member while remaining in driving engagement with said ring gear member for providing low speed operation.

2. A wheel hub according to claim 1, further comprising brake means 35, 36 actuable by said planet carrier 33 in response to reverse rotation thereof, and wherein there is angular play (angle $\alpha$) between said splines of said coupling sleeve member and said ratchet teeth 60 of said drive ring member 61 to an extent which is greater than the angular pitch between adjacent ones of said ratchet teeth 39 on said hub barrel member 19 which are engageable by said first pawl carrier means 37.

3. A wheel hub according to claim 2, further comprising friction means coupling said drive ring member 61 to said ring gear member 57 for positively taking up said angular play.

4. A wheel hub according to claim 1, wherein said driving member is in the form of a sleeve 40 having two sets of external spline teeth each formed adjacent to one end thereof, and in which said planet carrier and said ring gear member each comprise radially inwardly extending teeth, one set 44 of said external teeth being selectively engageable either with said inwardly extending teeth 45 of said planet carrier for high speed operation or with said inwardly extending teeth 56 of said ring gear member for normal speed and low speed operation, the other set 41 of external teeth being in continuous driving relationship to be driven by said sprocket member.

5. A wheel hub according to claim 1, wherein said driving member 75 comprises a plurality of driving arm portions selectively engageable by axial displacement thereof either with said planet carrier or with said ring gear member.

References Cited in the file of this patent

UNITED STATES PATENTS 3,057,227    Schwerdhöfer _____ Oct. 9, 1962